(No Model.) 2 Sheets—Sheet 1.
E. M. SCEARCE.
ICE CREAM FREEZER.
No. 468,900. Patented Feb. 16, 1892.
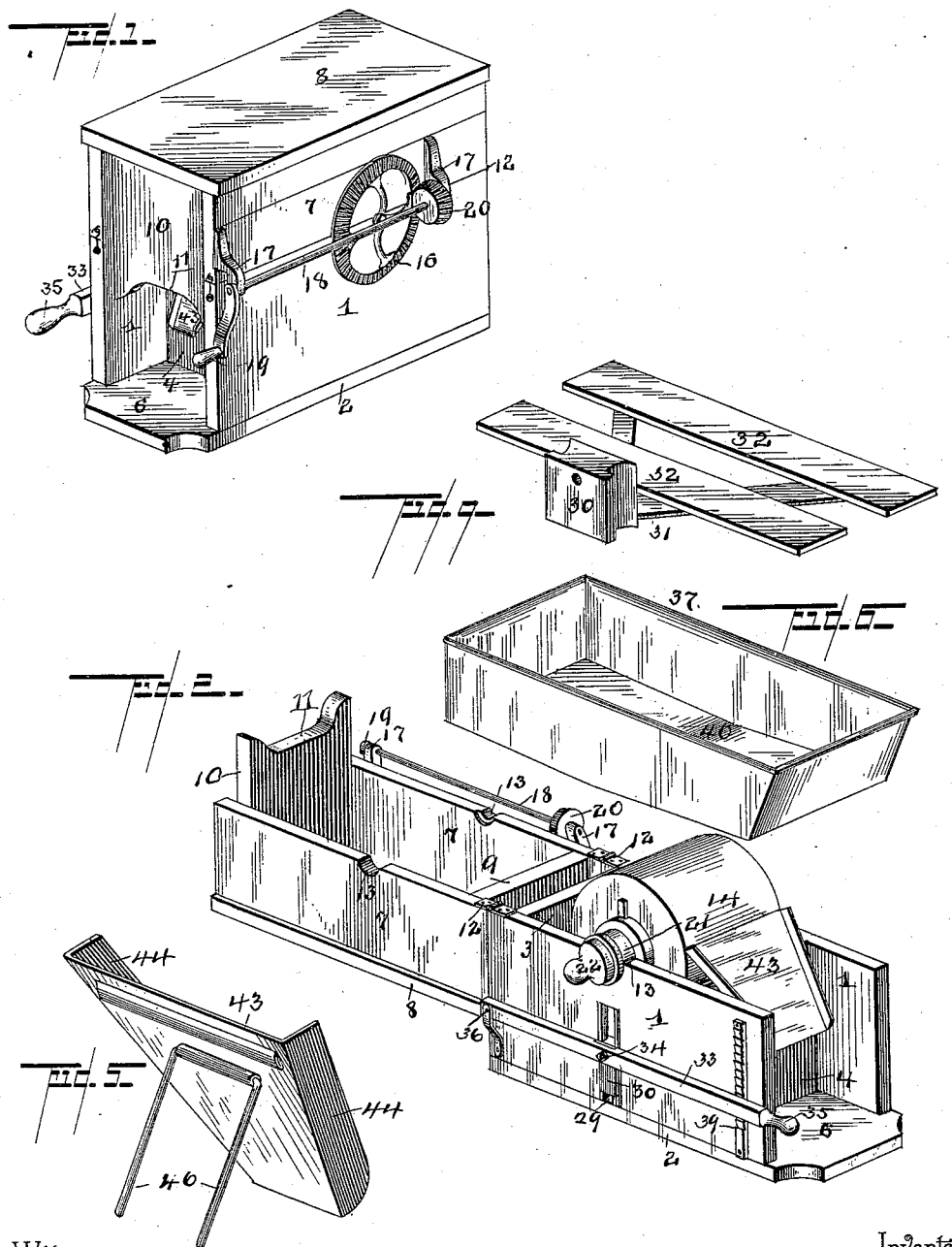

(No Model.) 2 Sheets—Sheet 2.
E. M. SCEARCE.
ICE CREAM FREEZER.
No. 468,900. Patented Feb. 16, 1892.
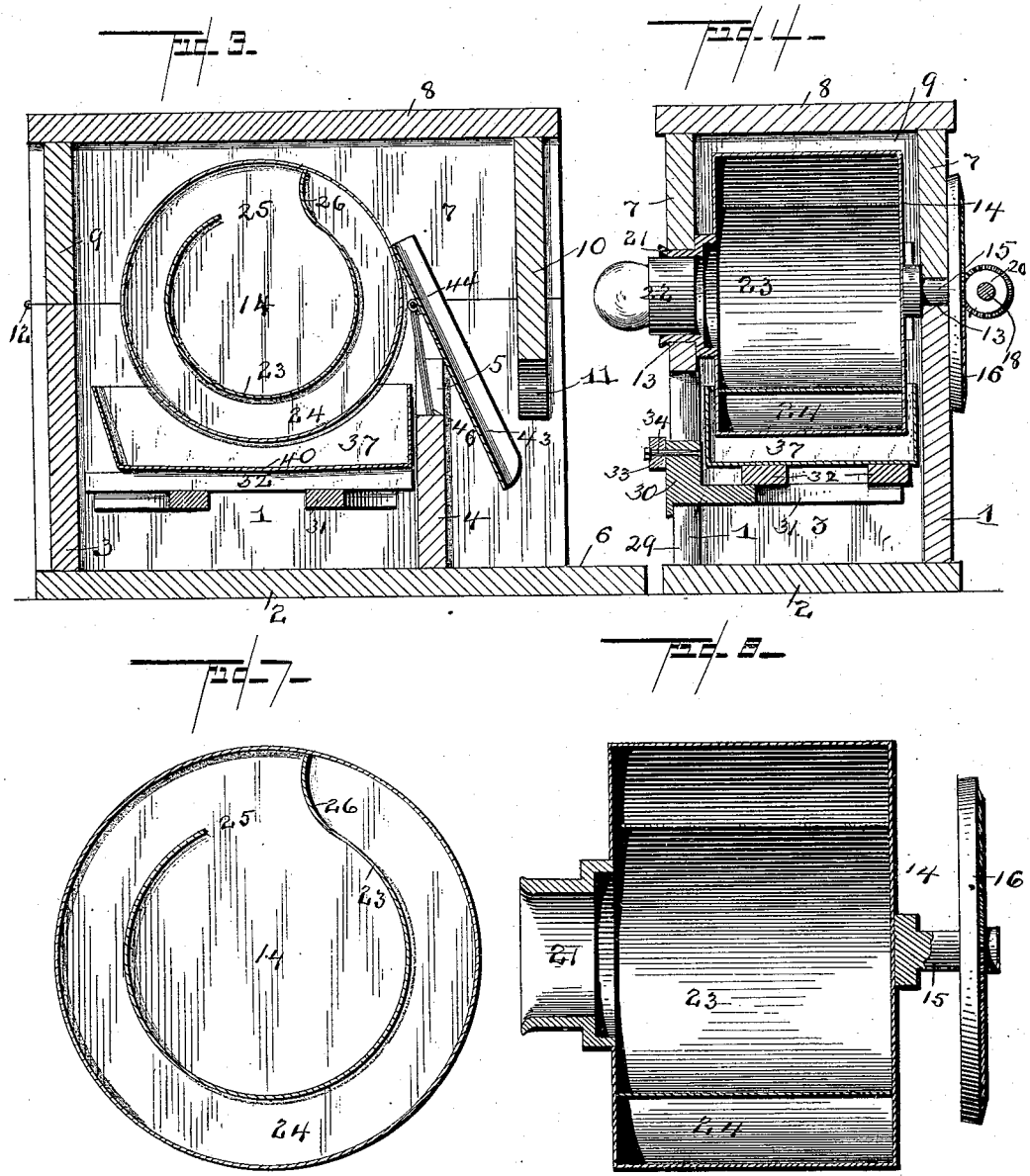
Witnesses
H. T. Seitz
W. S. Duvall
Inventor
E. M. Scearce,
By his Attorneys,
C. A. Snow & Co.

UNITED STATES PATENT OFFICE.

EDWARD M. SCEARCE, OF PARIS, MISSOURI, ASSIGNOR OF ONE-HALF TO JERE B. P. SMITH, OF SAME PLACE.

ICE-CREAM FREEZER.

SPECIFICATION forming part of Letters Patent No. 468,900, dated February 16, 1892.

Application filed August 25, 1891. Serial No. 403,744. (No model.)

*To all whom it may concern:*

Be it known that I, EDWARD M. SCEARCE, a citizen of the United States, residing at Paris, in the county of Monroe and State of Missouri, have invented a new and useful Ice-Cream Freezer, of which the following is a specification.

This invention relates to improvements in ice-cream freezers of that class employing a casing, a rotatable freezing-cylinder, and a scraping or delivery blade; and the objects in view are to provide a freezer that will economize the consumption of ice, that will thoroughly and expeditiously freeze cream, custards, and ices, and which will prevent any freezing of the same in cakes or lumps, but, to the contrary, will discharge finely-frozen granules of cream.

A further object of the invention is to improve the freezing-cylinder and adapt the same to automatically feed and retain the ice against the freezing-surface, whereby a uniform temperature of the cylinder is maintained and the cream uniformly frozen.

Other objects and advantages of the invention will appear in the following description, and the novel features thereof will be particularly pointed out in the claims.

Referring to the drawings, Figure 1 is a perspective of an ice-cream freezer constructed in accordance with my invention, the view being taken at the side of the operating-gears. Fig. 2 is a similar view taken at the opposite side of the machine with the cover open. Fig. 3 is a longitudinal section. Fig. 4 is a transverse section. Fig. 5 is a detail in perspective of the scraping-blade. Fig. 6 is a similar view of the cream-pan. Fig. 7 is a detail in longitudinal section of the refrigerating-cylinder. Fig. 8 is a transverse section of the same. Fig. 9 is a detail in perspective of the pan-supporting platform.

Like numerals of reference indicate like parts in all the figures of the drawings.

The casing comprises the opposite side walls 1, which rise from the opposite longitudinal edges of the bottom 2, and said side walls are connected at their rear ends or near the same by the rear wall 3, while the front of the casing some distance in rear of the front edges of the side walls is provided with a front wall 4, the upper edge of which is recessed or cut away at 5, as shown. The bottom wall 2 extends some distance beyond the front and side walls to form an extension 6 for the reception of ice-cream plates or other vessels to receive the frozen material.

The cover comprises the opposite side walls 7, the upper or top wall 8, the rear wall 9, and the front wall 10, the latter being considerably deeper than the side walls and adapted to take down between the side walls 1 and in front of the front wall 4, said wall 10 being cut away at its lower edge, as at 11. The rear meeting corners of the walls 1 and 7 are connected by hinges 12, whereby the cover may be swung back from over the casing.

Half-bearings 13 are formed in the meeting edges of the walls 1 and 7 for the purpose of receiving the journals of the freezing-cylinder 14. The freezing-cylinder 14 is provided at one side with a stub-shaft 15, fitting one of the bearings 13 and carries outside of the casing a large bevel-gear 16. Brackets 17 serve as a support for a longitudinal shaft 18, said brackets being secured to one of the walls 7 of the cover, and the shaft terminates at one end in an operating-crank 19, by which the shaft may be rotated, while near its opposite end a small pinion 20 is located, the latter engaging and driving the beforementioned large gear of the freezing-cylinder. At the opposite end of the cylinder an enlarged hollow shaft 21 is located, the same being fitted with a suitable stopper 22 and fitting the remaining bearing 13 of the casing-cover. Through this shaft is passed the crushed ice employed for refrigerating the cylinder. The cylinder is provided upon its interior with an annular wall 23, which combines with the outer wall of the cylinder to form an annular ice-space 24. The wall is not completed, but is provided with an opening 25, which forms communication between the interior of the inner annular wall and the ice-space, and one end of said inner annular wall is outwardly-bent, as at 26, to form an abutting wall.

In operation ice crushed to suitable-sized lumps is placed in the inner cylinder, and by rotating said cylinder in the direction opposite to that side of the opening therein at which the abutting wall is located the ice passes through the opening in the inner annular wall and into the ice-space between said annular wall and the outer wall of the cylinder, where the centrifugal force causes it to become packed in an annular layer within the space. This feeding of the ice to the ice-space will continue as long as the ice is consumed and any remains in the inner cylinder, so that the ice is prevented from shifting around and always falling to the bottom of the same, and is automatically fed and pressed in close contact with the outer wall of the cylinder throughout the inner surface of the same, and hence a saving of ice is effected and the same is utilized to the best advantage.

A dovetailed slot 29 is formed in one of the walls 1, and in the same there is mounted for sliding a dovetailed block 30, from the inner face of which into the casing above the bottom of the same extends a bracket 31. Upon the bracket is secured a platform 32, and the same receives and supports in an adjustable manner the cream-pan, all as will hereinafter appear. A lever 33 is pivoted between its ends, as at 34, to the block 30, and at its front end terminates in a handle 35, while its rear end is pivoted, as at 36, to the side of the wall 1. By raising and lowering the lever it will at once be obvious that the block, bracket, and platform are also raised and lowered, and with them the cream-pan 37, which is mounted upon the platform. The lever may be locked in any of its adjustments by swinging the same inwardly into engagement with any one of the teeth of a rack-bar 39, which is secured to the wall 1 at the inner side of and adjacent to the lever 33.

The cream-pan 37, which is mounted upon the platform 32, is provided with a bottom slightly curved or disposed toward the center, as indicated at 40, so that the tendency of the cream when placed in the pan is to run toward the center. When the cream-pan is in position and contains the cream in the unfrozen state, it will be seen that by manipulating the lever in the manner heretofore described the surface of the cream may be brought in contact with the freezing-cylinder. Such contact should only take place when the cylinder is in operation, as otherwise if permitted to have continued contact when the cylinder is at rest the cream congeals in a thick cake upon one point of the cylinder—that is, the immersed point—and the consequence would be that the cream when scraped from the cylinder, in a manner hereinafter described, will be a thick frozen cake or hunk, which is undesirable and to be avoided. By my invention the cream is frozen in granules, which is the acme of perfect cream and the object of all cream-makers.

In the recess 5 of the front wall 4 perforations 41 are formed, and in the same are removably seated the free ends of an inverted-U-shaped spring-bail 46, which extends upwardly within the recess. To the upper end of this bail there is hinged the V-shaped scraping or delivery blade 43, the opposite converging edges of which are bent to form flanges 44. The spring-bail serves to retain the rear edge of the combined scraper and delivery blade in contact with the periphery of the freezing-cylinder, whereby the thin coating of cream congealed upon the cylinder as the latter revolves is scraped from the cylinder, slides down the delivery-pan, and falls in a congealed mass into a waiting receptacle placed under the blade upon the bottom extension 6 of the case.

In operation it is simply necessary to swing the cover back, remove the freezing-cylinder from its bearings, and pour the cream, custard, or ice to be frozen into the cream-pan, which is then lowered by properly manipulating the lever 33. The cover is now replaced and a few rotations of the freezing-cylinder given, so as to force the ice or feed the same into the ice-space. The lever is now gradually raised until the frozen cream begins to discharge, when it will be evident that the surface of the cream is in contact with the freezing-cylinder, and the operation is continued, if desired, until the cream ceases to come, after which the lever is elevated another notch or so and the operation continued until the lever has been raised to its fullest extent and the cream is exhausted. The last remnants of the cream will flow to the concaved bottom of the cream-pan, so that all may be utilized. In this manner cream may be successfully and rapidly frozen and the most satisfactory results attained.

In filling the freezing-cylinder with ice the latter is removed from its bearings, which may be readily accomplished and stood upon that end to which is secured the large gear, in which position the latter will serve as a base and will steadily support the cylinder. The stopper is then removed and the crushed ice about the size of a walnut poured therein, after which the stopper is reinserted and the cylinder remounted in position.

From the foregoing description it will be obvious that I accomplish the objects of this invention by a machine of cheap and simple construction, easily cleaned and operated, and whose parts are readily reproduced and replaced when impaired.

Having described my invention, what I claim is—

1. In an ice-cream freezer of the class described, the combination, with a casing, a cream-receptacle, and a scraper, of a cylinder mounted for rotation in the casing, the same being provided with an internal annular wall, combining with the wall of the cylinder to form an annular ice-space, said wall having an opening forming communication between the ice-space and the interior of the cylinder, substantially as specified.

2. In an ice-cream freezer of the class described, the combination, with a casing, a cream-receptacle, and a scraper, of a cylinder mounted for rotation in the casing, the same being provided with an internal annular wall, combining with the wall of the cylinder to form an annular ice-space, said wall having an opening forming communication between the ice-space and the interior of the cylinder and at one end at one side of the opening outwardly bent against the periphery of the cylinder to form an abutting wall, substantially as specified.

3. In an ice-cream freezer of the class described, the combination, with a casing, a cream-receptacle, and a scraper, of a cylinder mounted for rotation in the casing, the same being provided with an internal wall, combining with the wall of the cylinder to form an annular ice-space, said internal wall having an opening forming communication between the ice-space and the interior of the cylinder, the head of the cylinder being provided with an opening communicating with the center of the cylinder, substantially as specified.

4. In an ice-cream freezer of the class described, the combination, with the oblong case, the front edge of which is set in rear of the front edges of the side walls and cut away, and the hinged oblong cover, the front wall of which is deeper than the side walls and cut away and located at the front edges of the side walls and in advance of the front wall of the case, of the freezing-cylinder mounted for rotation in the case, and the combined scraping and delivery blade mounted in the cut-away portion of the front wall of the case, substantially as specified.

5. In an ice-cream freezer of the class described, the combination, with the oblong case, the front edge of which is set in rear of the front edges of the side walls and cut away, and the hinged oblong cover, the front wall of which is deeper than the side walls and located at the front edges of the side walls and in advance of the front wall of the case, of the freezing-cylinder mounted in the casing, the inverted-U-shaped spring-bail having its terminals mounted in the perforations formed in the upper edge of the front wall of the case, and the combined scraping and delivery blade secured to the upper end of the bail and pressed by the latter into contact with the cylinder, substantially as specified.

6. In an ice-cream freezer of the class described, the combination, with the casing, the rotatable freezing-cylinder, and the scraping and delivery blade supported in contact therewith, of the block having V-shaped edges mounted for vertical movement in a dovetailed slot formed in the side walls of the case, a bracket extending from the block into the casing, a platform mounted on the bracket, a pan upon the platform, a lever pivoted between its ends to a block outside of the case and its rear end pivoted to the case, and means for locking the lever in any of its adjusted positions, substantially as specified.

In testimony that I claim the foregoing as my own I have hereto affixed my signature in presence of two witnesses.

EDWARD M. SCEARCE.

Witnesses:
JAS. LASLEY,
G. S. MANUEL.